(12) United States Patent
Godard et al.

(10) Patent No.: US 12,196,369 B2
(45) Date of Patent: Jan. 14, 2025

(54) BASE FOR PRESSURIZED GAS TANK

(71) Applicant: FAURECIA SYSTEMES D'ECHAPPEMENT, Nanterre (FR)

(72) Inventors: Yannick Godard, Blussans (FR); Nicolas Bachelard, Belfort (FR)

(73) Assignee: FAURECIA SYSTEMES D'ECHAPPEMENT, Nanterre (FR)

(*) Notice: Subject to any disclaimer, the term of this patent is extended or adjusted under 35 U.S.C. 154(b) by 134 days.

(21) Appl. No.: 17/920,849

(22) PCT Filed: Apr. 26, 2021

(86) PCT No.: PCT/EP2021/060840
§ 371 (c)(1),
(2) Date: Oct. 24, 2022

(87) PCT Pub. No.: WO2021/219551
PCT Pub. Date: Nov. 4, 2021

(65) Prior Publication Data
US 2023/0175649 A1 Jun. 8, 2023

(30) Foreign Application Priority Data
Apr. 27, 2020 (FR) .................... 20 04154

(51) Int. Cl.
F17C 13/00 (2006.01)

(52) U.S. Cl.
CPC .... *F17C 13/002* (2013.01); *F17C 2201/0109* (2013.01); *F17C 2203/0614* (2013.01);
(Continued)

(58) Field of Classification Search
CPC ............... F17C 13/002; F17C 13/06; F17C 2201/0109; F17C 2203/0614;
(Continued)

(56) References Cited

U.S. PATENT DOCUMENTS 6,173,968 B1    1/2001  Nelson et al.
7,857,159 B2   10/2010  Lindner
(Continued)

FOREIGN PATENT DOCUMENTS

CN    101509553 A    8/2009
CN    101832389 A    9/2010
(Continued)

*Primary Examiner* — Nathan J Jenness
*Assistant Examiner* — Madison L Poos
(74) *Attorney, Agent, or Firm* — Carlson, Gaskey & Olds, P.C.

(57) ABSTRACT

A base for a pressurized gas tank, such as hydrogen, is substantially circular about an axis, and comprises a substantially cylindrical pipe of axis, which passes through the base in order to connect an outside of the tank to an inside of the tank. A substantially tubular notch of axis is arranged on an inner side of the tank and is suitable for receiving a sealing envelope. A substantially tubular sleeve of axis is arranged on the inner side of the tank and has an inner diameter substantially equal to a diameter of the pipe and an outer diameter substantially equal to an inner diameter of the notch, and also has an axial extension at least equal to that of the notch. An O-ring and a groove of axis, capable of receiving the O-ring, are arranged in a side wall of the notch. The base also comprises a body and a substantially tubular ring of axis, interfaced by a surface of revolution about the axis passing through the groove.

10 Claims, 3 Drawing Sheets

(52) U.S. Cl.
CPC ............. *F17C 2205/0305* (2013.01); *F17C 2221/012* (2013.01); *F17C 2223/0123* (2013.01)

(58) Field of Classification Search
CPC ........ F17C 2205/0305; F17C 2221/012; F17C 2223/0123
USPC ................. 220/581, 582, 586, 592, 601
See application file for complete search history.

(56) References Cited

U.S. PATENT DOCUMENTS

| | | | |
|---|---|---|---|
| 8,640,910 B2 | 2/2014 | Novak et al. | |
| 10,323,795 B2 | 6/2019 | Kanezaki | |
| 10,458,598 B2 | 10/2019 | Kanezaki | |
| 2009/0200757 A1* | 8/2009 | Lindner | F16J 15/062 277/650 |
| 2009/0278322 A1 | 11/2009 | Schuetz et al. | |
| 2011/0220661 A1 | 9/2011 | Strack | |
| 2013/0341337 A1* | 12/2013 | Patterson | F17C 1/06 156/185 |
| 2014/0272670 A1 | 9/2014 | Strack et al. | |
| 2015/0166233 A1 | 6/2015 | Aoe et al. | |
| 2017/0082196 A1 | 3/2017 | Coleman | |
| 2018/0163927 A1 | 6/2018 | Kanezaki | |
| 2018/0372272 A1 | 12/2018 | Garg | |
| 2019/0063686 A1 | 2/2019 | Ogiwara et al. | |
| 2019/0257474 A1 | 8/2019 | Kanezaki et al. | |

FOREIGN PATENT DOCUMENTS

| | | |
|---|---|---|
| CN | 103672386 A | 3/2014 |
| CN | 105209801 A | 12/2015 |
| CN | 105705856 A | 6/2016 |
| CN | 108622562 A | 10/2018 |
| CN | 110630897 A | 12/2019 |
| CN | 111174083 A | 5/2020 |
| JP | 2000291887 A | 10/2000 |
| JP | 2005009591 A | 1/2005 |
| JP | 2008014342 A | 1/2008 |
| JP | 2018151047 A | 9/2018 |
| KR | 20230040241 A * | 12/2021 |
| WO | 0049330 A1 | 8/2000 |
| WO | 2000049330 A1 | 8/2000 |

* cited by examiner

BASE FOR PRESSURIZED GAS TANK

CROSS-REFERENCE TO RELATED APPLICATIONS

This application is the US national phase of PCT/EP2021/060840, which was filed on Apr. 26, 2020 claiming the benefit of French Application No. 20 04154, filed on Apr. 27, 2020, which is incorporated herein by reference in its entirety.

FIELD OF THE DISCLOSURE

The present disclosure relates to the field of tanks for pressurized gases, such as hydrogen, and more particularly to a base for such a tank.

BACKGROUND

It is known to produce such tanks by means of a structure, delimiting a volume of the tank, and a sealing envelope or "liner" covering the entire internal surface of the structure, so as to ensure a gas-tight seal. The structure is pierced by a hole in which a base is placed. This base is pierced by a pipe allowing to connect the inside of the tank with the outside of the tank, in order to be able to carry out the filling and drawing operations. The sealing envelope includes an opening coinciding with the hole and the pipe. It is necessary to ensure the seal between the opening and the pipe.

The higher the pressure, the more difficult it is to ensure sealing. A tank is qualified for a pressure of about 1035 to 1050 bars, but this can reach 1700 bars. Moreover, the gas molecule, especially in the case of hydrogen, can be very small, and the gas manages to pass through the smallest leakage section.

It is also known, in order to achieve this sealing, to make a substantially tubular notch in the base on the inside. The sealing envelope is typically made of elastomer material and presents a neck around the opening shaped so as to fit into the notch.

Due to its extrusion blow molding method, the sealing envelope, and with it its neck, presents a dimensional dispersion of the order of 0.5 mm, leading to a circular play between the neck and the notch of the same order. It is necessary to compensate for this circular play to ensure the seal.

To do this, it is possible to force the neck into the notch, by deforming it. However, such a forced fit requires the use of grease. Residual grease is a damaging pollution.

It is also known to include in the base a tubular sleeve, on the inner side of the tank, with an inner diameter greater than or equal to the diameter of the pipe and an outer diameter less than or equal to the inner diameter of the notch, and with an axial extension at least equal to that of the notch. Thus, the sleeve axially covers the neck of the sealing envelope over the depth of the notch. Expanding the sleeve, by passing a dowel through it, reduces the width of the notch by pinching the neck of the envelope over the entire circumference of the neck.

However, the use of the dowel is not very repeatable, and the expansion of the sleeve may not be sufficient to ensure the seal.

Therefore, a complementary solution is sought.

It is also known, according to U.S. Pat. No. 10,323,795, to add an O-ring and a groove suitable for receiving the O-ring.

SUMMARY

According to the disclosure, a body and a substantially tubular ring about an axis are added, the body and the tubular ring being interfaced by a surface of revolution about the axis passing through a groove.

For this purpose, the disclosure has as its object a base for a pressurized gas tank, such as hydrogen, the base being substantially circular about an axis. The base comprises a substantially cylindrical pipe about the axis, the cylindrical pipe passing through the base in order to connect an outside of the pressurized gas tank to an inside of the pressurized gas tank. A substantially tubular notch about the axis is arranged on the inside of the pressurized gas tank and is suitable for receiving a sealing envelope. A substantially tubular sleeve about the axis is arranged on the inside of the pressurized gas tank, and has an inner diameter substantially equal to a diameter of the cylindrical pipe and an outer diameter substantially equal to an inner diameter of the notch, and the tubular sleeve having an axial extension at least equal to that of the notch. An O-ring and a groove, suitable for receiving the O-ring, are arranged in a side wall of the notch. The base also comprises a body and a substantially tubular ring, the body and the tubular ring being interfaced by a surface of revolution about the axis passing through the groove.

Particular features or embodiments, usable alone or in combination, are:
- the groove is arranged in an outer wall of the notch,
- the base further comprises a washer, which can be arranged in the groove, between the O-ring and the tubular ring,
- the tubular ring presents a threaded outer cylindrical face, and the body presents a correspondingly threaded inner cylindrical face to enable the tubular ring and the body to be assembled by screwing,
- the tubular ring is assembled with the body by gluing or welding,
- the washer is split, by complete cutting of one of its sections, preferably according to an angle of 30° relative to the plane of the washer,
- the washer is made of an elastic material and presents a diameter at rest less than the outer diameter of the sealing envelope, so that its inner diameter automatically adapts to the outer diameter of the sealing envelope with a clamping force,
- the tubular sleeve is made of the same material as the body,
- the body and the tubular ring are made of metallic material, the O-ring is made of elastomeric material, and the washer is made of polymer, such as PTFE.

In a second aspect of the disclosure, a pressurized gas tank is provided that comprises such a base.

BRIEF DESCRIPTION OF THE FIGURES

The disclosure will be better understood from the following description, made only by way of example, and with reference to the appended figures in which.

DETAILED DESCRIPTION

Figure 1:
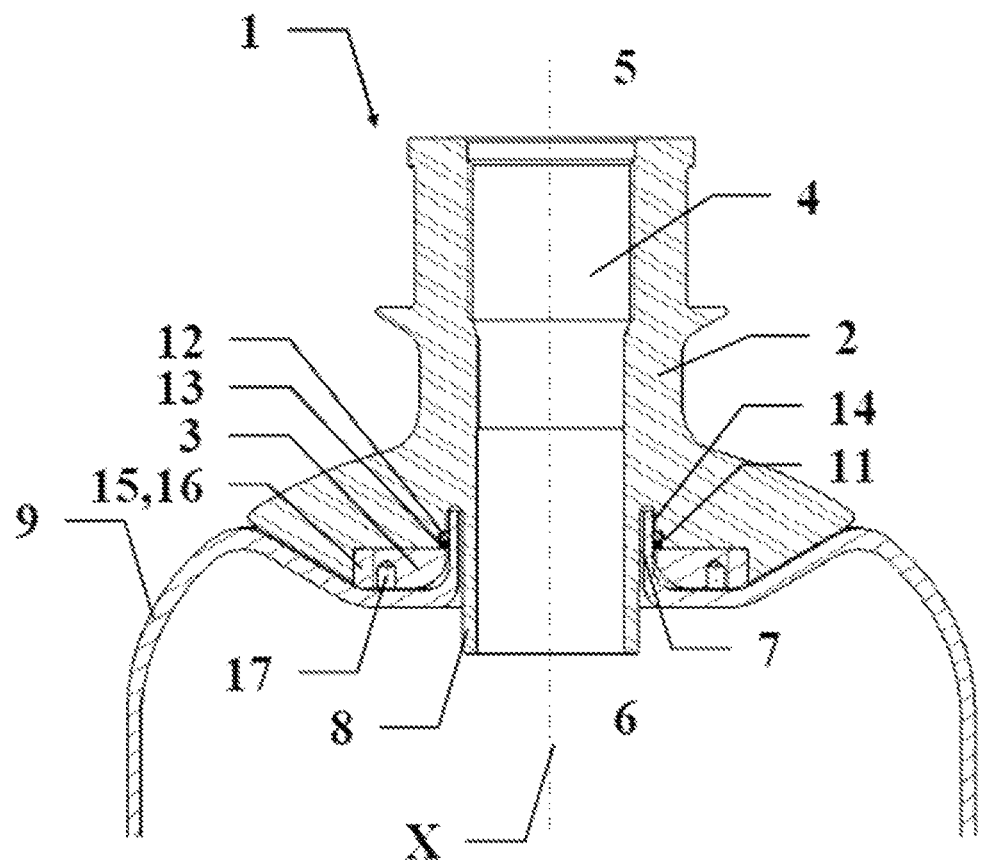
FIG. 1 shows a cutaway side view of a base assembled with a sealing envelope.
Figure 2:
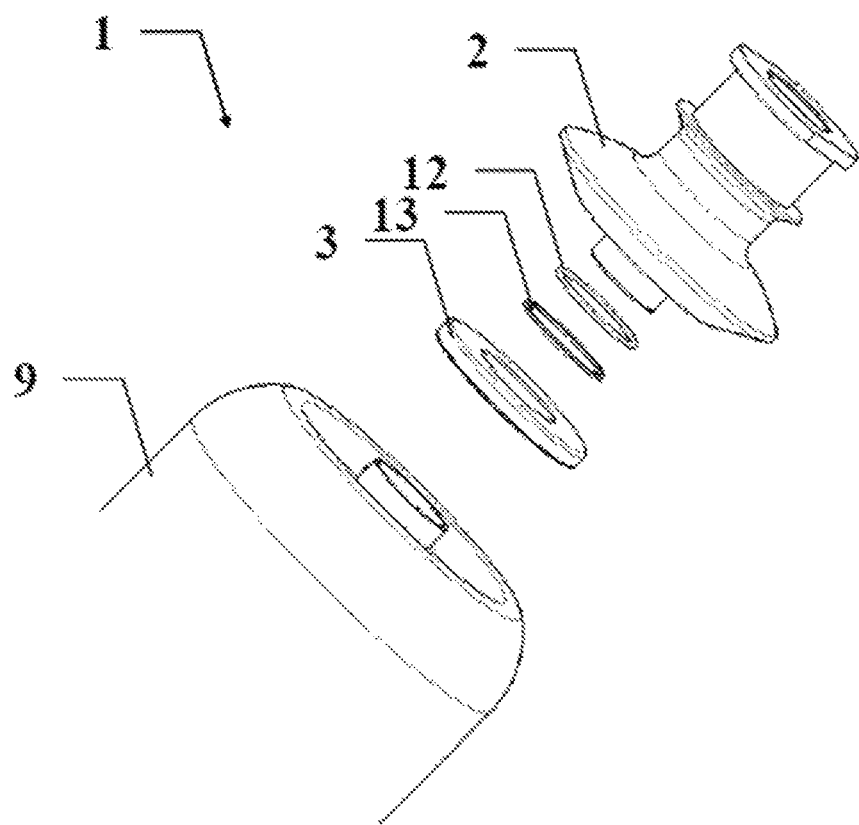
FIG. 2 shows an exploded perspective view of the assembly of FIG. 1.

A tank for pressurized gases, such as hydrogen, typically presents a substantially circular shape about an axis X. Such a tank comprises a structure (not shown), which can be made by winding a fiber, such as a glass fiber or a carbon fiber, previously coated with a binder, such as an epoxy, polyester or thermoplastic resin. The said structure gives rigidity to the tank and delimits its volume. The structure cannot ensure the gas tightness under pressure. A tank also comprises a sealing envelope 9. This envelope 9, most often flexible and made of elastomer and/or thermoplastic material, covers the entire internal surface of the structure, so as to ensure gas tightness.

In order to allow the filling and/or the drawing of gas, at least one opening is provided in the structure of the tank. The tank further comprises a base 1 arranged, in a fitted manner, in each of the said at least one opening. The fit is achieved here by making the structure around the base, typically by filament winding. An opening in the structure is formed, in this embodiment, by the presence of a base 1. A base 1 passes through relative to the structure. According to one embodiment, a base 1, generally metallic, comprises at least one through pipe 4 in order to allow a connection between the inside 6 and the outside 5 of the tank and thus the filling and/or the drawing of gas. According to one embodiment, a base 1 is substantially rotationally symmetrical about the X axis. Thus, for example, a base 1 can be substantially cylindrical.

Sealing is achieved via a sealed interface between the envelope 9 and a base 1. This tight interface is obtained, for example, by a notch 7 receiving the neck of the envelope 9.

With reference to FIG. 1, the base 1 is substantially circular about an axis X. This axis X is also the axis of symmetry of revolution of the substantially cylindrical tank (not shown), of its structure (not shown) and of the sealing envelope 9.

The base 1 is pierced by a substantially cylindrical pipe 4 of axis X, allowing to connect the outside 5 of the tank, here at the top in the plane of FIG. 1, to the inside 6 of the tank, here at the bottom in the plane of FIG. 1.

A substantially tubular notch 7 of axis X, arranged on the inside 6 of the tank, is provided in the base 1, around the pipe 4. It presents a recessed shape complementary to that of the neck of the sealing envelope 9 so as to be able to accommodate the neck of the sealing envelope 9.

The term tubular is used here to mean a hollow cylindrical shape, either solid or hollow. Thus, the neck presents a solid tubular shape, or a cylindrical shape, hollow due to the opening, but solid. On the contrary, the notch 7, which has a complementary shape to that of the neck, presents a hollow tubular shape, that is, a cylindrical shape, hollow due to the presence of the sleeve 8, and hollow.

A substantially tubular sleeve 8 of axis X, in this case a solid tube, arranged on the inner side 6 of the tank, is also attached to the base 1. The sleeve 8 presents an inner diameter substantially equal to the diameter of the pipe 4 and an outer diameter substantially equal to the inner diameter of the notch 7. It also presents an axial extension at least equal to that of the notch 7. This makes it possible, by expansion of the sleeve 8, by the passage of a dowel in the pipe 4, to reduce the width of the profile of the notch 7 so as to circularly pinch the neck of the sealing envelope 9.

This ensures a seal between the sealing envelope 9 and the base 1. However, this sealing should be improved by a second measure, in case the expansion of the sleeve 8 is not sufficient.

Also, according to an important feature of the disclosure, the base 1 further comprises an O-ring 12 and a groove 11 of axis X, to accommodate this O-ring 12. This groove 11 is arranged in a side wall of the notch 7.

As illustrated in FIG. 1, this groove 11 is the outer wall 14 of the notch 7. Alternatively, it would be possible to arrange the groove 11 in the inner wall of the notch for an equivalent implementation and result.

However, when it is produced by extrusion blow molding, the outer surface of the sealing envelope 9 is held against the tooling and therefore presents a better surface finish than the inner surface, which is rougher and may present bubbles. Machining to improve this inner surface is possible but requires an additional operation and causes additional cost.

Also, the arrangement of the groove 11 and therefore of the O-ring 12 facing this outer surface of the sealing envelope 9 is preferred, in that it allows a better seal to be obtained more quickly and at a lower cost.

This O-ring 12 applies an annular pressure on the outer surface of the neck of the sealing envelope 9, and thus cooperates with the expansion of the sleeve 8 against the inner surface of the neck. The two measures together ensure a perfect seal between the sealing sleeve 9 and the base 1.

The groove 11 is however difficult to access. The O-ring 12, being deformable, can nevertheless be placed in the groove 11. The same applies to a possible washer 13 described above. However, with a one-piece base 1, the width of the section of the notch 7, which is substantially equal to the thickness of the sealing envelope 9, typically a few millimeters, is too small to allow the passage of a tool suitable for machining the groove 11.

Therefore, in order to make the groove 11 accessible, the base 1 is made in two parts: a body 2 and a ring 3. The ring 3 is substantially tubular, in this case solid, of axis X. The contact surface that interfaces the body 2 and the ring 3 is a surface of revolution around the axis X passing through the groove 11. Thus, when the ring 3 is removed, the axial projection according to the X axis of the groove 11 is free and the groove 11 is axially accessible to a tool and can thus be machined in the body 2 and, if necessary, partly in the ring 3. The surface separating the body 2 from the ring 3 can be any. Advantageously, as shown, it is substantially flat at the level of the groove 11. Advantageously, it also merges with the outer lateral surface of the groove 11, so as to form said outer lateral surface of the groove 11.

According to another feature, a washer 13 is advantageously added. This washer 13 is dimensioned so that it can be arranged in the groove 11, between the O-ring 12 and the ring 3.

Its function is to close the circular space between the outer face 14 of the notch 7 and the outer face of the neck of the facing sealing envelope 9 so as to prevent extrusion of the O-ring 12 between the envelope 9 and the ring 3, under the effect of the high gas pressures.

The assembly of the body 2 and the ring 3 can be made according to any embodiment. According to a first embodiment, the ring 3 can be screwed to the body 2 by the use of screws, advantageously parallel to the X axis. According to another embodiment, the ring 3 includes a cylindrical outer face 15 and the latter is threaded, according to an X-axis thread, and the body 2 presents a homologous and threaded cylindrical inner face 16. Thus, the ring 3 can be screwed into the body 2, by rotation about the X axis. An interface feature, such as holes 17, allows a rotation tool to be engaged.

According to another embodiment, the assembly of the ring 3 with the body 2 is carried out by gluing. According to yet another embodiment, the assembly is carried out by welding.

Figure 3:
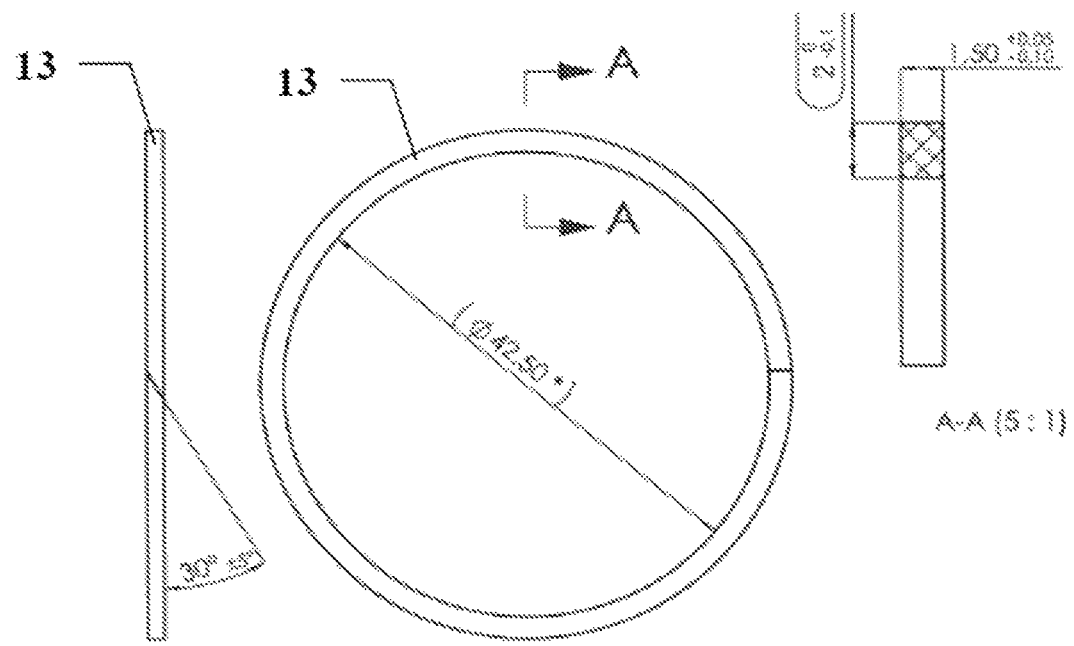
FIG. 3 shows a plan of a washer, with from left to right, a profile view, a front view and an enlarged section.

According to another feature, more particularly illustrated in FIG. 3, the washer 13 is split, by a complete cut through one of its sections, preferably at an angle of 30° relative to the plane of the washer 13. This gives the washer 13 a certain deformability and allows it to adapt to different diameters. Thus, its inner diameter can adapt to the outer diameter of the sealing envelope 9, which the washer 13 surrounds at the neck. This diameter of the neck of the envelope 9 can vary by +/−0.5 mm due to manufacturing tolerances. The 30° bevel functions as a groove in that it allows to maintain an overlap of the two lips of the cup, and thus to ensure a circular continuity of the washer 13, in contact with the O-ring 12, in spite of a variation of the diameter. The washer 13 presents any cross section, preferably rectangular, as shown.

According to another feature, the washer 13 is made of an elastic material and its diameter at rest is less than the outer diameter of the sealing envelope 9. Thus, the diameter of the washer 13 automatically adapts to the diameter of the sealing envelope 9, even when the latter varies. This compensates for dimensional variations from one envelope 9 to another, but also for dimensional variations of the same envelope 9 under the effect of pressure or temperature. Due to the elasticity of the material of the washer 13, the diameter adjustment is carried out with a certain constraint. Therefore, a restoring force creates a tightening of the washer 13 around the neck of the envelope 9. This maintains an adaptive contact between the inner diameter of the washer 13 and the outer diameter of the envelope 9 and thus an absence of play According to another feature, the sleeve 8 is made of material with the body 2.

According to another feature, the body 2 and the ring 3 are made of metallic material.

According to another feature, the O-ring 12 is made of elastomer material in a conventional manner.

According to another feature, the washer 13 is made of a polymer, such as PTFE, in order to give it the rigidity and elasticity required for its functions.

The disclosure further relates to a pressurized gas tank comprising such a base 1.

To make a tank, the base 1 is prepared by mounting the O-ring 12 in the groove 11. Then the washer 13 is placed in the groove on the O-ring 12. The O-ring 12 and washer 13 assembly is held in place by assembling the ring 3 to the body 2.

The envelope 9 is then put in place, by engaging its neck in the notch 7. The neck forces the washer 13, which deforms to allow the neck to pass and adjusts around its diameter.

The assembly of the envelope 9 with the base 1 is done by gluing. The adhesive has another advantage. It is possible, due to machining tolerances, that a slight gap may appear at the triple point of the interface between the body 2, the ring 3 and the envelope 9. The adhesive advantageously fills the gap and thus prevents it from rubbing the envelope 9. The adhesive allows any possible gap between the base 1 and the envelope 9 to be filled.

An expansion of the sleeve 8 can advantageously be obtained by passing a dowel through the sleeve 8. This expansion allows the neck of the envelope 9 to be held against the facing wall 14 of the notch 7 and against the O-ring 12 in order to reinforce the sealing. This operation is carried out after the sealing envelope 9 has been put in place.

The structure of the reservoir is then made, typically by winding a fiber filament coated with a resin.

The disclosure has been illustrated and described in detail in the drawings and the preceding description. The latter should be considered illustrative and given by way of example and not as limiting the disclosure to this description alone.

LIST OF REFERENCE SIGNS

1: base,
2: body,
3: ring,
4: pipe,
5: outside,
6: inside,
7: notch,
8: sleeve,
9: envelope,
11: groove,
12: O-ring,
13: washer,
14: outer face of the notch,
15: outer face of the ring,
16: inner face of the body,
17: hole.

The invention claimed is:

1. A base for a pressurized gas tank, the pressurized gas tank delimiting an inside and an outside, and the pressurized gas tank being circular about an axis, the base comprising:
   a cylindrical pipe about the axis and piercing the base, the cylindrical pipe passing through the base in order to connect an outside of the pressurized gas tank to an inside of the pressurized gas tank;
   a tubular notch about the axis, the tubular notch being arranged on the inside of the pressurized gas tank and configured to receive a sealing envelope;
   a tubular sleeve about the axis, the tubular sleeve being arranged on the inside of the pressurized gas tank with an inner diameter equal to a diameter of the cylindrical pipe and an outer diameter equal to an inner diameter of the tubular notch, and the tubular sleeve having an axial extension at least equal to that of the tubular notch;
   an O-ring and a groove about the axis, the groove configured to receive the O-ring, and being arranged in a side wall of the tubular notch;
   wherein the base comprises a body and a tubular ring about the axis, wherein the body and the tubular ring are interfaced by a surface of revolution about the axis passing through the groove; and
   wherein the tubular ring presents a threaded outer cylindrical face, and the body presents a corresponding threaded inner cylindrical face to enable assembly of the tubular ring and the body by screwing.

2. The base according to claim 1, wherein the groove is arranged in an outer wall of the tubular notch.

3. The base according to claim 1, further comprising a washer configured to be arranged in the groove, between the O-ring and the tubular ring.

4. The base according to claim 3, wherein the washer is split, by a complete cutting through a section of the washer.

5. The base according to claim 4, wherein the washer is cut according to an angle of 30° relative to a plane of the washer.

6. The base according to claim 3, wherein the washer is made of elastic material and has a diameter at rest less than an outer diameter of the sealing envelope, so that an inner diameter of the washer automatically adapts to the outer diameter of the sealing envelope with a clamping force.

7. The base according to claim 3, wherein the body and the tubular ring are made of metallic material, the O-ring is made of elastomeric material, and the washer is made of polymer.

8. The base according to claim 1, wherein the tubular ring is assembled with the body by gluing or welding.

9. The base according to claim 1, wherein the tubular sleeve is made of material with the body.

10. A pressurized gas tank, comprising the base according to claim 1.

* * * * *